US012350855B2

(12) United States Patent
Torres Martinez

(10) Patent No.: US 12,350,855 B2
(45) Date of Patent: Jul. 8, 2025

(54) SHEAR CUTTING SYSTEM WITH ORIENTABLE BLADE

(71) Applicant: M. TORRES DISEÑOS INDUSTRIALES, S.A.U., Torres de Elorz (ES)

(72) Inventor: Manuel Torres Martinez, Torres de Elorz (ES)

(73) Assignee: M. TORRES DISEÑOS INDUSTRIALES, S.A.U., Torres de Elorz (ES)

( * ) Notice: Subject to any disclaimer, the term of this patent is extended or adjusted under 35 U.S.C. 154(b) by 0 days.

(21) Appl. No.: 18/591,595

(22) Filed: Feb. 29, 2024

(65) Prior Publication Data

US 2024/0293950 A1 Sep. 5, 2024

(30) Foreign Application Priority Data

Mar. 3, 2023 (ES) ................................ ES202330184

(51) Int. Cl.
*B26D 7/26* (2006.01)
*B26D 1/00* (2006.01)
*B26D 5/04* (2006.01)

(52) U.S. Cl.
CPC ......... *B26D 7/2628* (2013.01); *B26D 1/0006* (2013.01); *B26D 5/04* (2013.01); *B26D 2001/0066* (2013.01)

(58) Field of Classification Search
CPC ...... B26D 1/0006; B26D 5/04; B26D 7/2628; B26D 2001/0066
USPC ............................................................ 83/559
See application file for complete search history.

(56) References Cited

U.S. PATENT DOCUMENTS

| | | | | |
|---|---|---|---|---|
| 4,063,481 A * | 12/1977 | Raudys | B26D 1/385 83/580 |
| 4,799,415 A | 1/1989 | Gerdes | |
| 10,272,581 B2 * | 4/2019 | Crispel | B26D 5/10 |
| 2003/0047043 A1 * | 3/2003 | Nelson | B23D 23/04 83/13 |
| 2005/0247178 A1 * | 11/2005 | Hetcher | B23D 45/044 83/581 |
| 2008/0216963 A1 | 9/2008 | Hamlyn et al. | |

FOREIGN PATENT DOCUMENTS

DK 639388 A 5/1990

OTHER PUBLICATIONS

Spanish Search Report for Corresponding Spanish Patent Application No. 202330184, Oct. 23, 2023, 4 pages.

* cited by examiner

*Primary Examiner* — Nhat Chieu Q Do
(74) *Attorney, Agent, or Firm* — LUCAS & MERCANTI, LLP

(57) ABSTRACT

A shear cutting system for fibre tape taping machines in which the cutting of the fibre tape (1) is performed transversely with respect to the movement of the fibre tape (1) by shearing 5 between a cutting blade (2) and a counter blade (3) in an opposite relative movement between the cutting blade (2) and the counter blade (3), characterised in that it has orientation device for a blade support (4) of the cutting blade (2) configured for orienting the cutting blade (2) according to a cutting angle selected for cutting the fibre tape (1).

8 Claims, 5 Drawing Sheets

SHEAR CUTTING SYSTEM WITH ORIENTABLE BLADE

CROSS-REFERENCE TO RELATED APPLICATION

This application claims priority of Spanish Application No. P202330184 filed Mar. 3, 2023 the contents of which is incorporated herein by reference.

TECHNICAL FIELD

The present invention relates to the industry dedicated to the formation of parts by means of synthetic fibres such as glass fibres or carbon fibres, in which a machine or head applies several layers of fibre strips, and more specifically to the cutting system for cutting said fibre strips for deposition thereof with a shear cutting method.

STATE OF THE ART

Application heads for applying synthetic fibre strips for forming parts are widely known today. Conventionally, these applicator heads perform a successive application of synthetic fibre strips until covering the entire surface of the part to be formed, consecutively superimposing application layers until determining the thickness of the desired part. This type of system is commonly used in the aeronautical industries and the like, where the trend and demand of the sector require more productive, reliable and automatic systems.

In this regard, for cutting the strips to be applied, shear cutting exhibits simpler and more economical mechanics than rotary cutting in which, instead of making a transverse cut on the strip, a tangential cut is made by causing the rotation of the dolly on the blade. In this sense, there are application heads that apply a fibre strip the width of which determines the number of passes necessary to cover the entire application surface, such that if very wide strips are used, the number of passes is lower, but wasted application material increases as a result of the cuts necessary to adapt to the contour of the part to be formed. This situation occurs because cutting the strips by shearing is performed with a 90° cut with respect to the orientation of the fibres, which produces surpluses that must be trimmed manually later or require a subsequent process with another machine or with a system of the same machine that trims the surpluses following the contour of the part to be formed.

In order to reduce wasted material, there are heads that apply strips having a small width, however, heads of this type increase the number of passes and thereby increase production times, lowering productivity, in addition to the fact that it is still necessary to subsequently cut the surpluses.

Additionally, in many cases the 90° cut prevents the interior reinforcements from adapting to the theoretical contour, so it necessary to add excess material which increases the weight of the final part.

In view of these disadvantages of the solutions existing today for shear-cutting fibre application heads, there is a need for a solution which allows eliminating or reducing said wasted material while at the same time providing high productivity and ensuring correct application of the fibre strips when forming parts.

OBJECT OF THE INVENTION

In order to meet this objective and solve the technical problems discussed up until now, in addition to providing additional advantages which may be derived below, the present invention provides a shear cutting system for fibre tape taping machines in which the cutting of the fibre tape is performed transversely with respect to the movement of the fibre tape by shearing between a cutting blade and a counter blade in a relative movement between said cutting blade and the counter blade, which comprises orientation means for a support of the cutting blade configured for orienting the cutting blade according to a cutting angle selected for cutting the fibre tape.

As a result of this configuration, the surpluses derived from conventional 90° shear cutting are eliminated or reduced, where any orientation of the blade can be adopted for adaptation to the contour of the part, with the rotation of the blade support, and therefore of the blade itself, preferably being in orientations of 45°, 0° and −45°. Production times are reduced while maintaining the cutting reliability provided by the shearing system. Furthermore, this cutting system allows reducing the minimum application strip, for example, to values of 100 mm of minimum strip, since the distance between the cutting point and the compacting point is smaller than in other known cutting systems.

According to a feature of the invention, the blade support comprises the counter blade such that both the cutting blade and the counter blade rotate due to the action of the orientation means. The blade support therefore comprises both shearing elements, i.e., both the cutting blade and the counter blade or dolly, such that they rotate at the same time to cause cutting, which translates into a more compact system, instead of orienting only the cutting blade, which would require a counter blade of a greater volume.

Preferably, the cutting blade is arranged in a fixed manner in the blade support, i.e., without any transverse movement with respect to the fibre tape, only having a rotary movement for its orientation, and the counter blade being transversely movable with respect to the movement of the fibre tape against the cutting blade in order to cause the shear cutting of the fibre tape.

This configuration prevents the blade from being damaged during its movement since, being cantilevered, it may bend and collide against the counter blade.

To ensure that the counter blade does not collide against the blade directly as it moves transversely with respect to the fibre tape, but rather slightly above same to cause the shearing of the fibre tape which is retained between both, the blade support preferably comprises a guide element, preferably in the form of a recess, for the movement of the counter blade transverse to the fibre tape.

According to a feature of the invention, the counter blade has an intermediate threading groove for the passage of the fibre tape, such that, during cutting, the counter blade drives the fibre tape against the cutting blade remaining inside said threading groove. In other words, the counter blade comprises an inner groove through which the fibre tape passes as it moves towards the application roller typical of the fibre application heads, such that shear cutting occurs when the fibre tape is retained between the wall of the groove of the counter blade and the blade. The fibre tape is therefore kept in its position of movement by remaining at all times in the threading groove which guides its movement towards the application roller.

Additionally, preferably, the blade support comprises a return spring for returning the counter blade, that pushes the fibre tape to its original position of movement. Since the fibre tape remains inside the threading groove, when the counter blade is forced to return, it pushes the fibre tape to its correct position for the application movement thereof.

Jamming or a poor application due to the fibre tape coming out of its position of movement of application is thereby prevented. Said return spring would also be contemplated in embodiments in which the counter blade does not have a threading groove.

According to another aspect of the invention, the blade support has two prolongations or walls projecting parallel to the movement of the fibre tape between which the fibre tape is arranged, having an inlet and/or an outlet of the blade support with a funnel shape that guides the movement of the fibre tape. It is contemplated that said projections may be formed in the blade support itself or an attachment that can be connected to said support. As a result to this configuration, the fibre tape is kept in position and prevented from coming out of its line of movement, thereby preventing it from creasing or being stepped on incorrectly on the application surface.

Preferably, these prolongations of the blade support have a circular disc-shaped configuration, and in correspondence with guides having a semicircular section which guide the blade support during the rotation for orienting the cutting blade.

This configuration ensures a precise rotation of the blade, preventing it from buckling due to its cantilevered positioning.

The orientation means preferably comprise a rotation element that can be connected to the blade support and a drive which causes the rotation of said rotation element according to the required orientation to perform cutting with the blade. A motor which engages the rotation element that can be connected to the blade support is provided as an example of the drive.

Additionally, according to an embodiment of the invention, the rotation element of the orientation means comprises a cogged element, preferably a pinion, the drive being at least one pneumatic cylinder comprising a cogged drive element in the form of a rack, in an actuator rod of the pneumatic cylinder which, in cooperation with the cogged element of the rotation element drives the rotation of the blade support.

As a result of this configuration, a more precise orientation of the blade is achieved and it can be programmed such that automatic rotation occurs based on the needs of the part to be formed.

DETAILED DESCRIPTION OF THE INVENTION

In light of the aforementioned figures, and in accordance with the adopted numbering, one may observe therein a preferred non-limiting exemplary embodiment of the invention, which comprises the parts and elements indicated and described in detail below.

Figure 1:
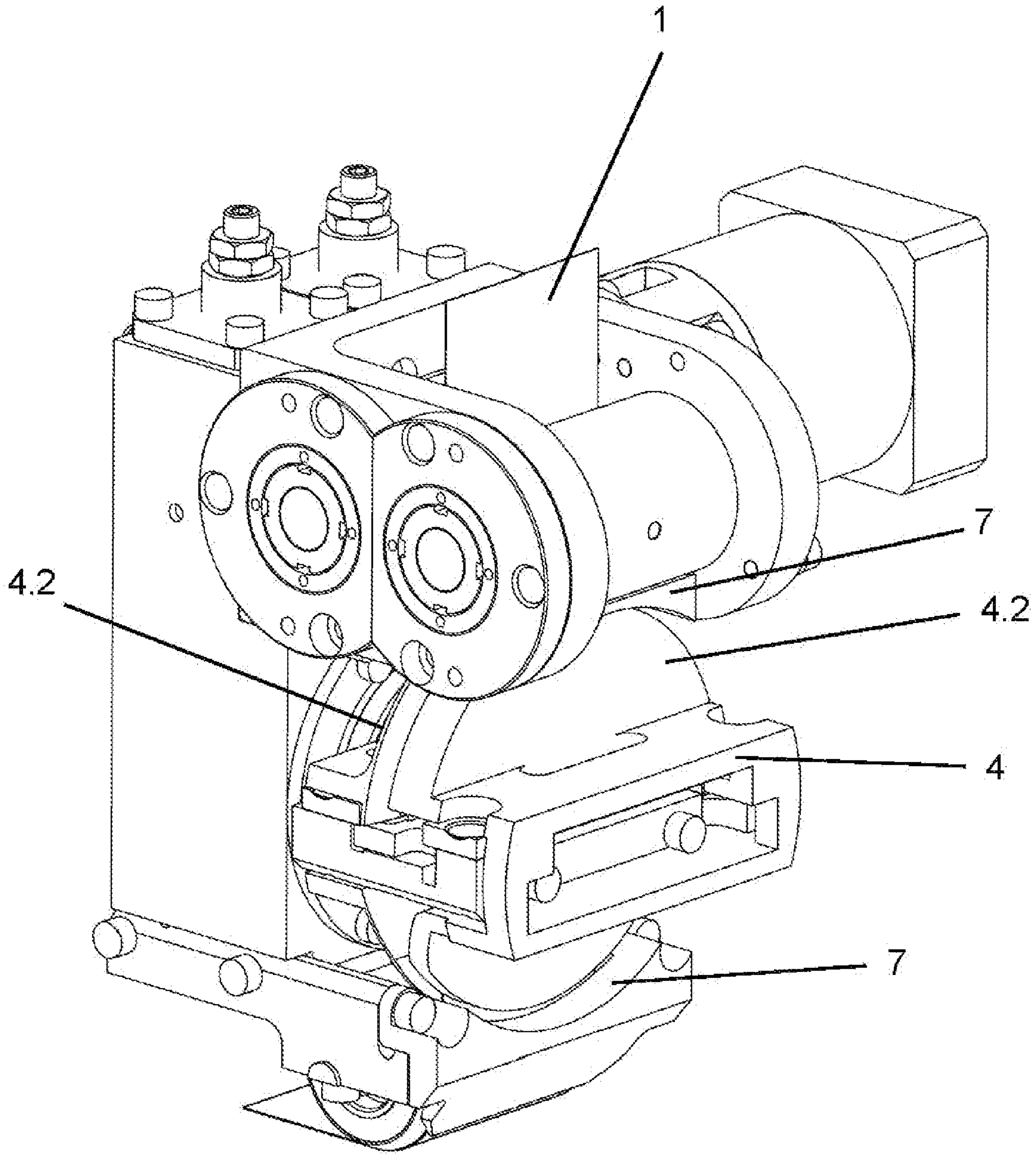
FIG. 1 shows a perspective view of a fibre tape application head with a shear cutting system object of the invention.

A practical example of an application head for applying a fibre tape (1) to form parts can be seen in FIG. 1. In that sense, the fibre tape (1) is dispensed from a spool, that is not depicted, to a deposition roller for depositing the fibre tape (1) which applies pressure on the fibre tape (1) for application thereof on the surface, applying cuts on the fibre tape (1) for each strip of fibre tape (1) deposited. Applications of this type are preferably performed for aviation or the like in which the geometry of the parts is not regular, thus requiring a subsequent step of applying trims in order to adapt the surface of the applied fibre tape to the contour of the part. To avoid said subsequent trimming step, the invention contemplates a shear cutting system with an orientable blade support (4) configured for orienting the cutting blade (2) based on the orientation of the contour of the part to be manufactured.

Figure 2:
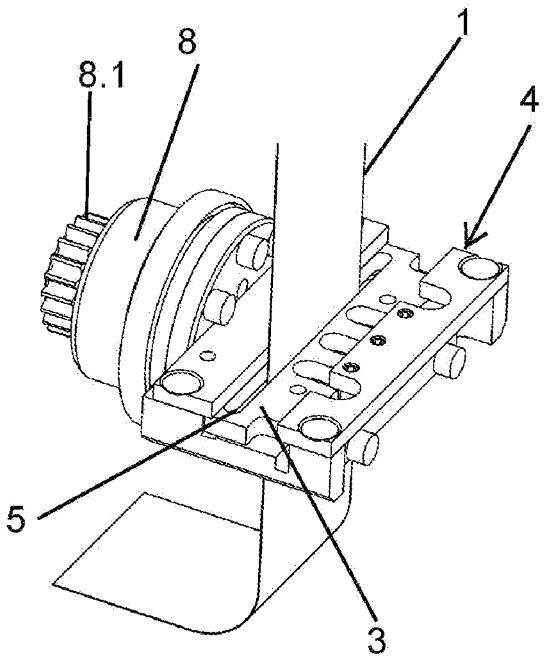
FIG. 2 shows a detailed perspective view of a design option of a blade support of the cutting system of the invention, with the fibre tape in its position of movement of application before cutting.
Figure 3:
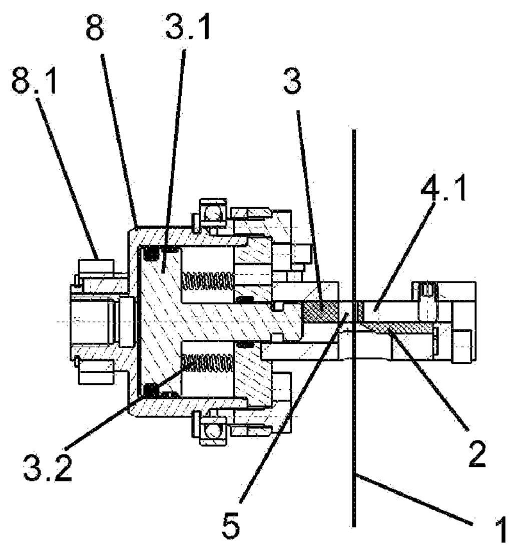
FIG. 3 shows a cutaway view of FIG. 2, in which the blade and the counter blade can be better seen.

Said orientable blade support (4) can be seen in a simplified manner in FIG. 2, preferably having a rectangular structure, which support, as can be seen in greater detail in FIG. 3, comprises a cutting blade (2) and a counter blade (3) with a relative movement between them, forming a shearing assembly to cause the cutting of the fibre tape (1) by shearing between said blades.

Therefore, in the preferred embodiment of the figures, the cutting blade (2) remains stationary and it is the counter blade (3) which moves against the cutting blade (2) pushing the fibre tape (1) to cause the shear cutting thereof. However, the cutting blade (2) being the one that moves, with the counter blade (3) remaining stationary to cause the cutting, as is conventional, is not ruled out in other embodiments.

To perform the cutting of the fibre tape (1) according to the angle predetermined by the contour of the part, the cutting system comprises orientation means which cause the rotation of the blade support (4), rotating the blade (2) fixed to the same support in order to orient it according to said predetermined angle, thereby avoiding the subsequent step of trimming excess edges with respect to the contour of the part to be formed. The combination of shear cutting and orientation rotation therefore allows a quick and reliable cutting, performing fibre tape application automatically without adding a subsequent post-processing step.

According to a design option, as can be seen in FIGS. 4 to 7, the shear cutting system comprises a counter blade drive (3.1), which will preferably be a pneumatic cylinder that moves the counter blade (3), in turn moving the fibre tape (1) against the blade (2) to cause the shear cutting thereof. Said counter blade drive (3.1) is driven by means of control means which automatically drive same based on the geometry of the part and the application speed of the fibre tape (1).

For returning said counter blade drive (3.1) to its initial position, it is envisaged for the cutting system to comprise return springs (3.2) for returning the counter blade drive (3.1).

Figure 5:
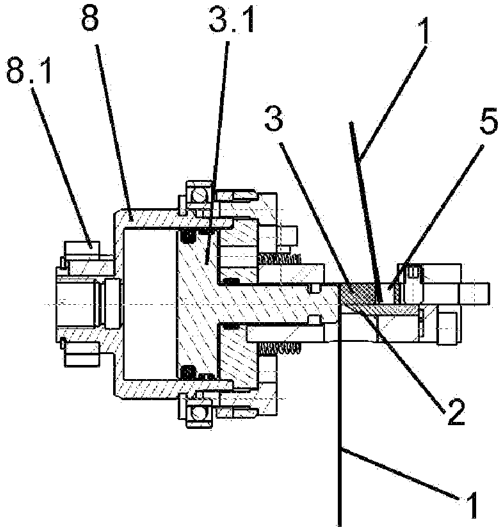
FIG. 5 is a cutaway view of FIG. 4.

Therefore, as can be seen in FIG. 5, when the counter blade drive (3.1) is driven, the counter blade (3) pushes the fibre tape (1) against the blade (2) causing shear cutting.

According to a preferred embodiment, such as the one shown in the figures, the counter blade (3) comprises a through threading groove (5), located in an intermediate area of the counter blade (3) which allows maintaining the positioning of the fibre tape (1) for movement thereof towards the application roller.

Figure 8A:
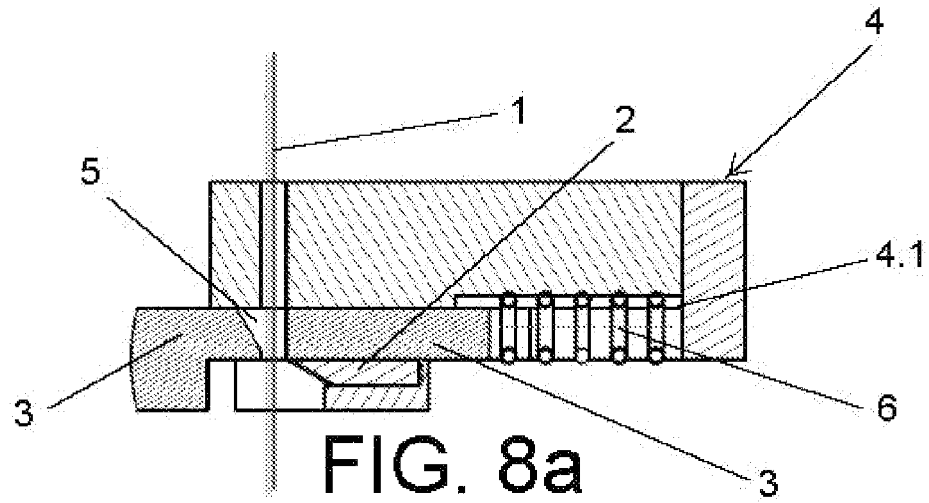
FIGS. 8*a*, 8*b* and 8*c* schematically show the sequence of shear cutting the fibre tape with a movable counter blade.
Figure 8B:
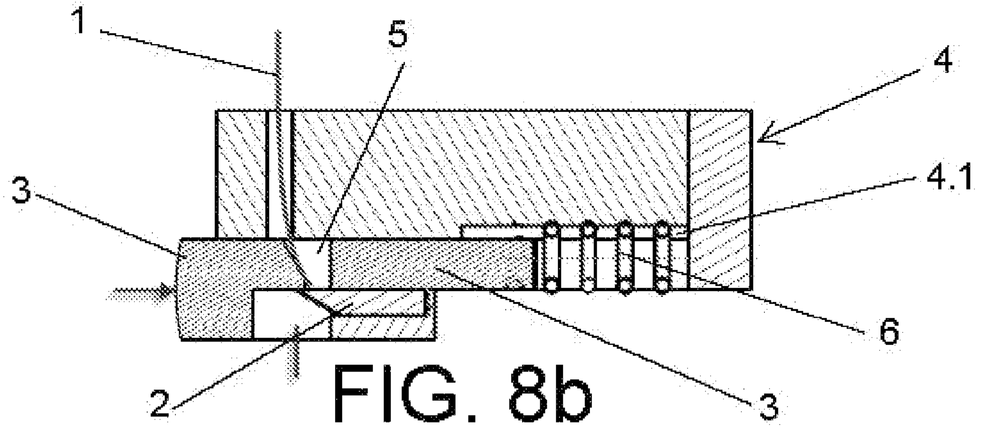
Figure 8C:
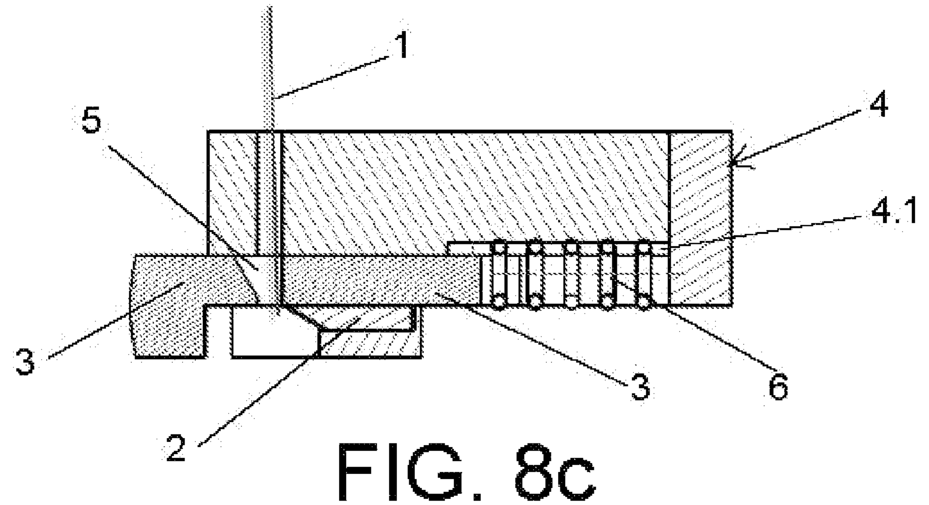

A cutting sequence of the fibre tape (1) can be seen in FIGS. 8*a*, 8*b* and 8*c*. First, in an initial position, the fibre tape (1) passes through the counter blade (3) along the threading groove (5) thereof in movement for application, as can be seen in FIG. 8*a*.

Next, when the fibre tape (1) is to be cut, the counter blade (3) moves according to the indication of the depicted arrow, in a direction towards the blade (2), such that the fibre tape (1) is pushed against the blade (2) being retained between the counter blade (3) and the blade (2) and causing the shear cutting thereof as a result of the force of movement of the counter blade (3). As can be seen, the blade (2) remains stationary in the blade support (4) with the cutting edge towards the upper portion which meets the counter blade (3) that in turn can have a cutting edge in the portion of the threading groove (5) which interacts with the blade (2) (in FIGS. 8*a*, 8*b*, 8*c*, the left wall).

Once cutting has taken place, the fibre tape (1) remains inside the threading groove (5) of the counter blade (3), so it remains in a movement guide element which prevents jamming or creasing of the fibre tape (1). In order to better ensure that the fibre tape (1) is kept in its position of movement, it is envisaged for the blade support (4) to comprise a return spring (6) which causes the return of the counter blade (3) by driving it towards its initial position, pushing the fibre tape (1) to its position of movement, which serves to help the fibre tape (1) to come out of a bending position such as the one shown in FIG. 8*b*, and to return to the initial position as can be seen in FIG. 8*c*.

According to a design option, the threading groove (5) of the counter blade (3) will have a ramp-shaped inlet as can be seen in FIGS. 8*a*, 8*b*, 8*c*, which facilitates the entry of the fibre tape (1) into the initial feed and contributes to an improved shear cutting.

Additionally, as can be seen in FIGS. 3, 6, 8*a*, 8*b* and 8*c*, the blade support (4) comprises a guide element (4.1), in the form of a recess, which guides the movement of the counter blade (3), thereby ensuring a perfect shear cutting. The aforementioned return spring (6) for returning the counter blade (3) prevents the jamming of the fibre tape (1) inside said guide element (4.1) when being pushed by the right wall of the threading groove (5) as a result of the thrust of the return spring (6) for returning the counter blade (3).

Figure 6:
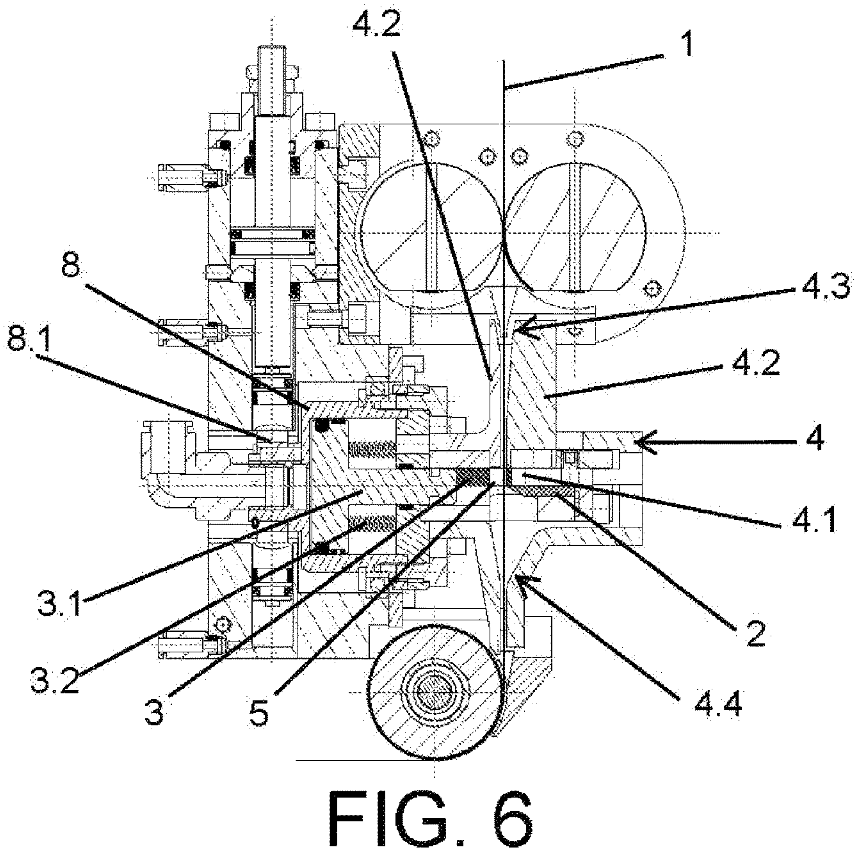
FIG. 6 is a cutaway view of the fibre tape application head with the shear cutting system object of the invention, with the fibre tape in its position of movement of application before cutting.
Figure 7:
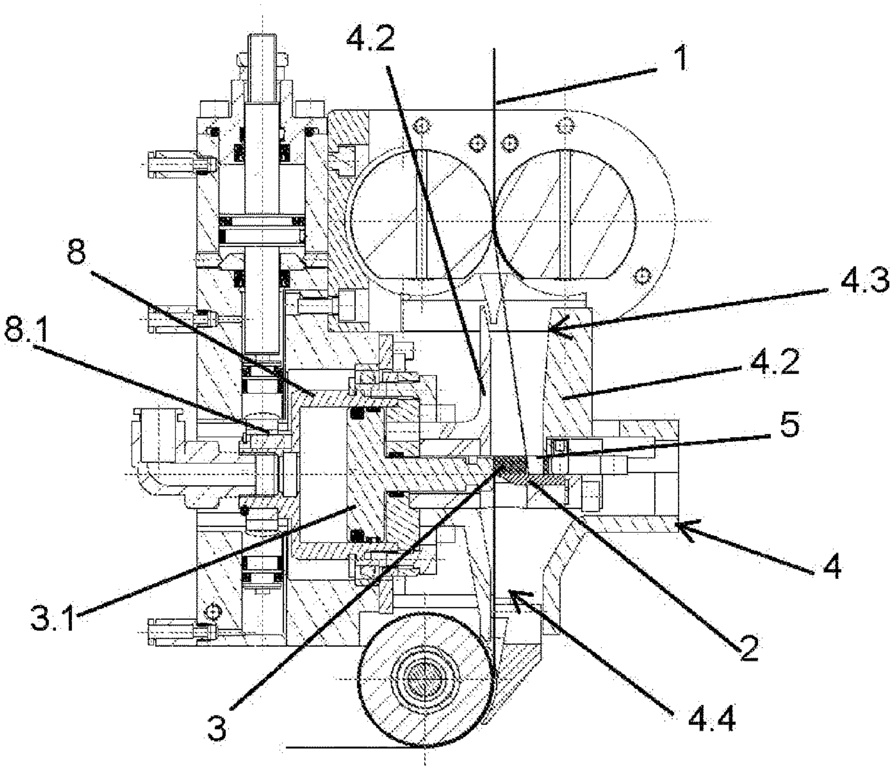
FIG. 7 is a cutaway view such as that of FIG. 6 but in this case at the time of shear cutting the fibre tape.

According to a practical embodiment, as can be seen in FIGS. 1, 6 and 7, the blade support (4) comprises prolongations (4.2) projecting parallel to the movement at least in the upper portion, and preferably also towards the lower portion. These prolongations (4.2) can form a single solid element with the blade support (4) or can be coupling elements that can be connected to the blade support (4).

These prolongations (4.2) provide lateral support to the fibre tape (1), serving as a guiding channel for guiding the movement thereof. According to a preferred embodiment, at least the upper inlet (4.3), and preferably also the lower outlet (4.4) of the prolongations (4.2) of the blade support (4), have a funnel shape which guides the fibre tape (1) to prevent it from coming out of its guiding channel.

According to a practical embodiment, the prolongations (4.2) have a circular disc-shaped configuration, and in correspondence with guides (7) having a semicircular section as can be seen in FIG. 1, such that said guides (7) guide the blade support (4) during rotation for orienting the cutting blade (2), ensuring the correct rotation of the blade (2) without buckling. Furthermore, as can be seen in FIG. 7, at the time of cutting the fibre tape (1), the prolongation (4.2) or right disc preferably moves together with the counter blade, allowing the movement of the fibre tape (1) to prevent stresses in the fibre tape (1).

According to another practical embodiment, the orientation means comprise a rotation element (8) that can be connected to the blade support (4) that can optionally be an integral part of the blade support (4), and a drive which causes the rotation of said rotation element (8) in turn causing the rotation of the blade support (4) and orienting the blade (2) according to the predetermined orientation.

Figure 4:
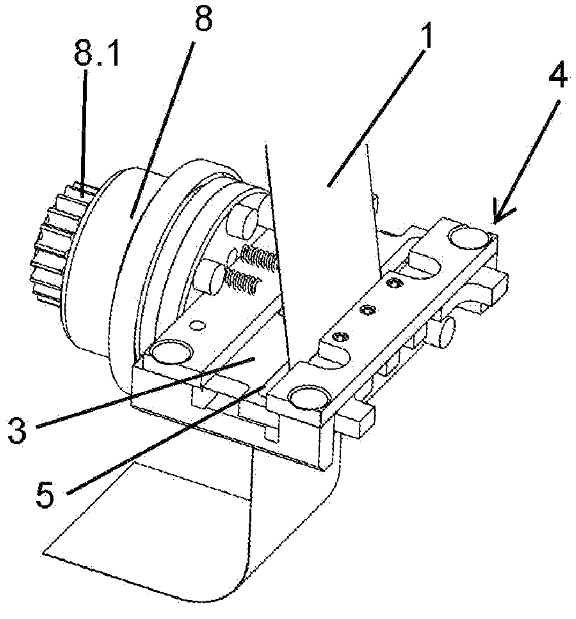
FIG. 4 is a view such as that of FIG. 2, in this case at the time of shear cutting the fibre tape.

Preferably, as can be seen in FIGS. 2 and 4, the rotation element (8) comprises a cogged element (8.1) of the form of a pinion for driving the rotation controlled by the control means.

Figure 9:
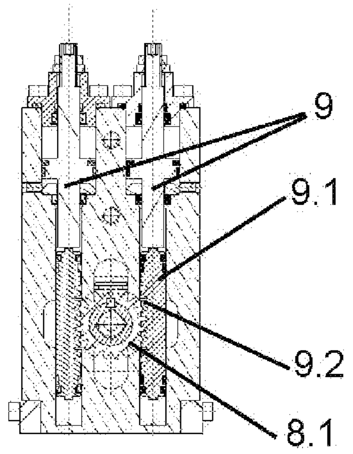
FIG. 9 shows a detailed section view of the orientation means of the blade support, with the blade forming 90° with the fibre tape.
Figure 10:
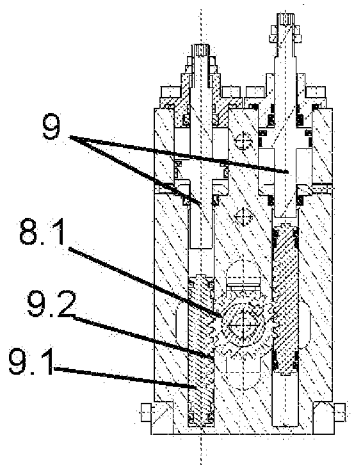
FIG. 10 shows a detailed section view of the orientation means of the blade support, with the blade forming 45° with the fibre tape.

According to a design alternative, as can be seen in FIGS. 9 and 10, for said drive of the pinion (8.1), the orientation means comprise at least one pneumatic cylinder (9) and preferably one on each side of the pinion (8.1), the actuator rod (9.1) of which comprises a cogged drive element (9.2) in the form of a rack, such that the control means drive said pneumatic cylinders (9) according to the orientation predetermined for the blade (2), with the rotation preferably being −45°, 0° and 45°.

Figure 11:
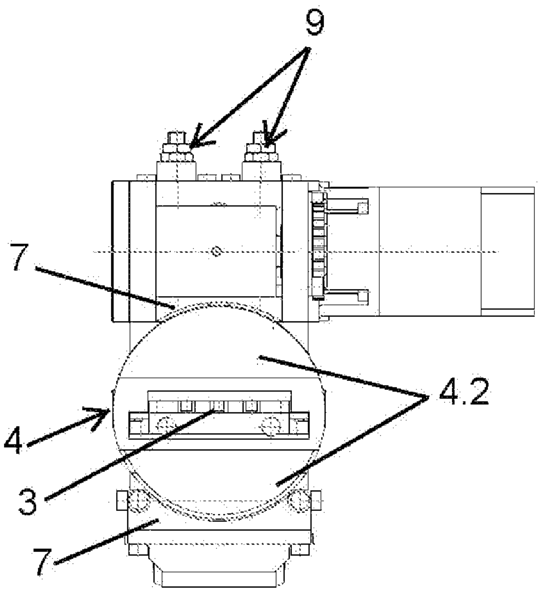
FIG. 11 is a front view in which the blade support can be seen forming 90° with the fibre tape such as in FIG. 9.
Figure 12:
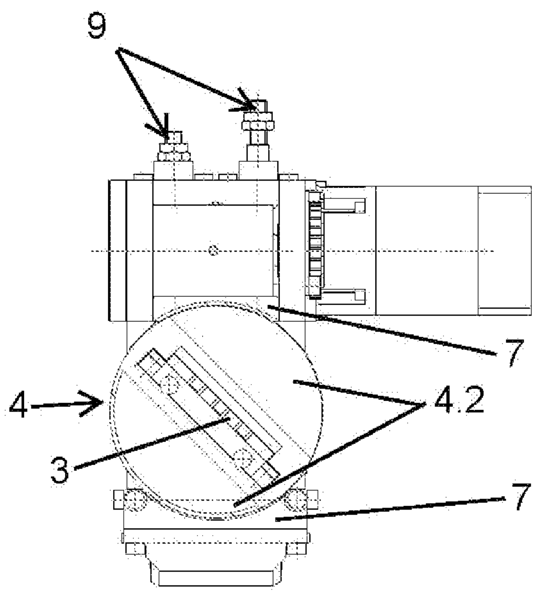
FIG. 12 is a front view in which the blade support can be seen forming 45° with the fibre tape such as in FIG. 9.

Therefore, FIGS. 9 and 11 would correspond to an angle of 0°, i.e., when the blade (2) is arranged perpendicular to the fibre tape (1) causing a 90° cut on the tape (1). Furthermore, in the case of FIGS. 10 and 12, with the blade support (4) and accordingly the blade (2) forming an angle of 45°, such that a 45° cut would be made on the tape (1).

The invention claimed is:

1. A shear cutting system for fibre tape taping machines, the shear cutting system comprising:

a cutting blade (2) and a counter blade (3) in which the cutting of a fibre tape (1) is performed transversely with respect to the movement of the fibre tape (1) by shearing between the cutting blade (2) and the counter blade (3) in an opposite relative movement between said cutting blade (2) and the counter blade (3);

wherein the counter blade (3) has an intermediate through threading slot (5) for a passage of the fibre tape (1), such that, during cutting, the counter blade (3) drives the fibre tape (1) against the cutting blade (2), the fibre tape (1) remaining inside said threading slot (5);

orientation means for a blade support (4) of the cutting blade (2) configured for orienting the cutting blade (2) according to a cutting angle selected for cutting the fibre tape (1), wherein the orientation means comprise a rotation element (8) that connects to the blade support (4) and a drive which causes the rotation of said rotation element (8) in turn causing the rotation of said blade support (4) according to the required orientation, and wherein the rotation element (8) of the orientation means comprises a cogged element (8.1), the drive in cooperation with the cogged element (8.1) of the rotation element (8), drives the rotation of the blade support (4).

2. The shear cutting system according to claim 1, wherein the blade support (4) comprises the counter blade (3) such that both the cutting blade (2) and the counter blade (3) rotate due to the action of the orientation means.

3. The shear cutting system according to claim 1, wherein the cutting blade (2) is arranged in a fixed manner in the blade support (4), and the counter blade (3) is transversely movable with respect to a movement of the fibre tape (1) against the cutting blade (2) causing the shear cutting of the fibre tape (1).

4. The shear cutting system according to claim 3, wherein the blade support (4) has a guide element (4.1) for the movement of the counter blade (3) transverse to the direction of movement of the fibre tape (1).

5. The shear cutting system according to claim 1, wherein the blade support (4) comprises a return spring (6) for returning the counter blade (3) to its initial position.

6. The shear cutting system according to claim 1, wherein the blade support (4) has two prolongations (4.2) each having a circular disc-shaped configuration and projecting parallel to the movement of the fibre tape (1) between which the fibre tape (1) is arranged, with an inlet (4.3) and/or an outlet (4.4) of the blade support (4), wherein the inlet (4.3) and the outlet (4.4) has a funnel shape that guides the movement of the fibre tape (1).

7. The shear cutting system according to claim 6, wherein the prolongations (4.2) of the blade support (4) and in correspondence with guides (7) having a semicircular section guide the blade support (4) during rotation for orienting the cutting blade (2).

8. The shear cutting system according to claim 1, wherein the drive is at least one pneumatic cylinder (9) comprising a cogged drive element (9.2) in an actuator rod (9.1) of the pneumatic cylinder (9).

* * * * *